United States Patent [19]

Takahashi

[11] Patent Number: 5,581,901
[45] Date of Patent: Dec. 10, 1996

[54] LIFESAVING APPARATUS

[75] Inventor: Masakatsu Takahashi, Ashiya, Japan

[73] Assignees: M. Takahashi; T. Takahashi, both of Hyogo; R. Takahashi; M. Hashimoto, both of Tokyo; C. Yamada, Niigata; K. Takahashi, Shiga, all of Japan

[21] Appl. No.: 297,760

[22] Filed: Aug. 30, 1994

Related U.S. Application Data

[63] Continuation-in-part of Ser. No. 140,084, Oct. 29, 1993, Pat. No. 5,383,285.

[30] Foreign Application Priority Data

Mar. 2, 1992 [JP] Japan ..................................... 4-81728

[51] Int. Cl.[6] .............................. G01B 3/10; A62B 1/06
[52] U.S. Cl. ................... 33/756; 33/760; 33/765; 33/771; 182/231; 182/236; 428/375; 428/394; 428/395; 428/902
[58] Field of Search .......................... 33/755, 756, 759, 33/760, 765, 771; 242/84.8; 182/10, 11, 73, 231, 232, 235, 236, 237; 428/375, 392, 394, 395, 902

[56] References Cited

U.S. PATENT DOCUMENTS

| 288,447 | 11/1983 | Keith et al. ........................ 182/235 |
| 2,602,233 | 7/1952 | Irving ..................................... 33/756 |
| 2,994,958 | 8/1961 | Beeber .................................. 33/771 |
| 3,630,488 | 12/1971 | Stangl ................................... 182/231 |
| 5,042,613 | 8/1991 | Hermann ........................... 182/232 X |
| 5,383,285 | 1/1994 | Takahashi ............................ 33/756 |

FOREIGN PATENT DOCUMENTS

| 0571855 | 5/1924 | France ................................. 33/755 |
| 1561428 | 3/1969 | France ................................. 33/765 |
| 3503779 | 8/1986 | Germany ........................... 33/771 |
| 59-73945 | 5/1984 | Japan . | |
| 62-117501 | 7/1987 | Japan . | |
| 2123955 | 2/1984 | United Kingdom ............ 33/771 |

Primary Examiner—William A. Cuchlinski, Jr.
Assistant Examiner—G. Bradley Bennett
Attorney, Agent, or Firm—Antonelli, Terry, Stout & Kraus

[57] ABSTRACT

A lifesaving apparatus comprising a scale usable as a life line, the scale comprising a high tensile strength wire with graduations in a longitudinal direction thereof, a drum for winding the metal wire thereonto, a casing accommodating the drum while permitting the same to rotate, a magnifying glass on the casing for allowing the graduations to be read, and a person carrying system. The high tensile strength wire of high tensile strength is formed of a stranded cable formed of a plurality of strands each having a tensile strength of at least 400 kgf/mm$^2$ such that the high tensile strength wire is capable of suspending a person. The strands have a coat of a synthetic resin covering the strand. The person carrying system is connected to an end of the scale.

3 Claims, 6 Drawing Sheets 5,581,901

LIFESAVING APPARATUS

CROSS-REFERENCE TO RELATED APPLICATIONS

This is a continuation-in-part of application Ser. No. 08/140,084 filed on Oct. 29, 1993, now U.S. Pat. No. 5,383,285 issued Jan. 24, 1995.

BACKGROUND OF THE INVENTION

The present invention relates to a lifesaving apparatus. More particularly, it relates to lifesaving apparatus employing a scale which is usually used for measuring a relatively long distance like a tape measure and utilizable, in case of emergency, as a life line for permitting a person to escape from a structure such as a building.

Heretofore, there has been known a tape measure, or a convex scale wherein a tape of textile or thin steel sheet which is graduated on either side thereof is windably accommodated within a casing for winding.

On the other hand, there has been known a life line wherein a rope-unwinding device with a braking mechanism is provided in a casing which is securely anchored to a window of a building, and a rope or Seil of about 10 mm in diameter which is partially wound around the drum of the rewinding device is secured at each end thereof to a belt for holding the body of a person. This life line is arranged so that when one person is saved using the belt at one end of the rope, the other belt at the other end would be raised for saving another person.

It should be noted that conventionally the aforesaid tape measure and life line have been manufactured and used completely independently of each other.

The conventional tape measure can measure a distance of at most about 20 m. If a longer measuring tape is accommodated in the casing, the casing would be made extremely large in size. There has also been known a small scale of the type which is convenient to be carried but can measure a distance of only about 2 to about 3 m.

The aforesaid life line is installed in a building and, hence, one who is about to escape from the building must reach the window equipped with such a life line.

It is an object of the present invention to provide a scale usable as a life line which is convenient to be carried and capable of measuring a long distance substantially equal to or longer than the distance that can be measured by the conventional scale, while, in case of emergency, being utilizable as a private-use life line which permits a person to escape from any window of a building.

SUMMARY OF THE INVENTION

A lifesaving apparatus comprising a scale usable as a life line, said scale comprising a high tensile strength wire with graduations in a longitudinal direction thereof, a drum for winding the wire thereonto, a casing accommodating the drum while permitting the same to rotate, a magnifying glass on said casing for allowing the graduation to be read, and means for carrying a person, wherein the high tensile strength wire is formed of a stranded cable formed of a plurality of strands each having a tensile strength of at least 400 kgf/mm$^2$ such that said high tensile strength wire is capable of suspending a person, said strands having a coat of a synthetic resin covering the strand, and said means for carrying a person is connected to an end of said scale.

It is preferable said means for carrying a person comprises a belt for trousers, said belt connected at an end of said scale, and a pulley for winding said scale positioned adjacent said person's shoulder.

As the high tensile strength wire, a metal wire or a combined wire of a steel strand combined with aramid fibre formed of steel strand, are preferably employed.

With the scale usable as a life line according to the present invention, when it is used for measuring purposes, the metal wire of high tensile strength is drawn out of the drum like a common tape measure and used to measure something with the help of the magnifying glass, followed by rewinding the metal wire onto the drum upon completion of the measurement. In case of emergency, for example, of fire, the scale can be used as a life line for permitting a person to escape from a window with the metal wire tied at an end portion thereof to a window frame, a piece of furniture or the like and with the casing secured to the person with a belt or the like.

The scale of the present invention employs the high tensile strength wire. Hence, even if the wire is relatively long, it can be wound onto the drum and accommodated within the casing. Further, the high tensile strength wire is not shaped into a tape but into a wire; therefore, relatively even stress is exerted on the cross section thereof, assuring a high tensile strength. In addition, the strength of the metal wire will not largely decrease even if it undergoes torsion.

Graduations provided on a wire material are inevitably small and, hence, hard to view. In the present invention, however, small graduations provided on the of high tensile strength wire can be read with ease through the magnifying glass provided in the casing. Therefore, the present invention facilitates the measuring operation while at the same time improving the tensile strength of the wire.

DETAILED DESCRIPTION

A scale according to the present invention will now be described with reference to the drawings.

Figure 1:
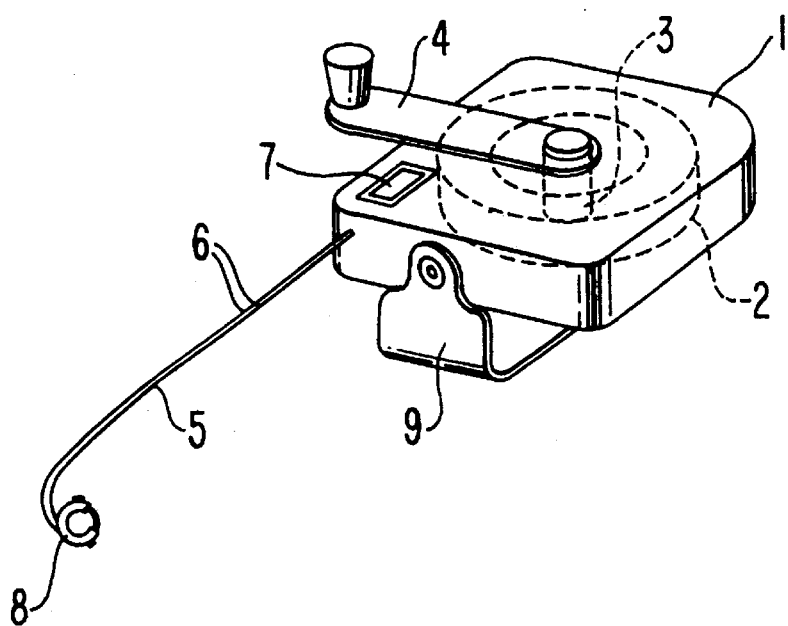
FIG. 1 is a perspective view showing an embodiment of a scale according to the present invention.
Figure 2:
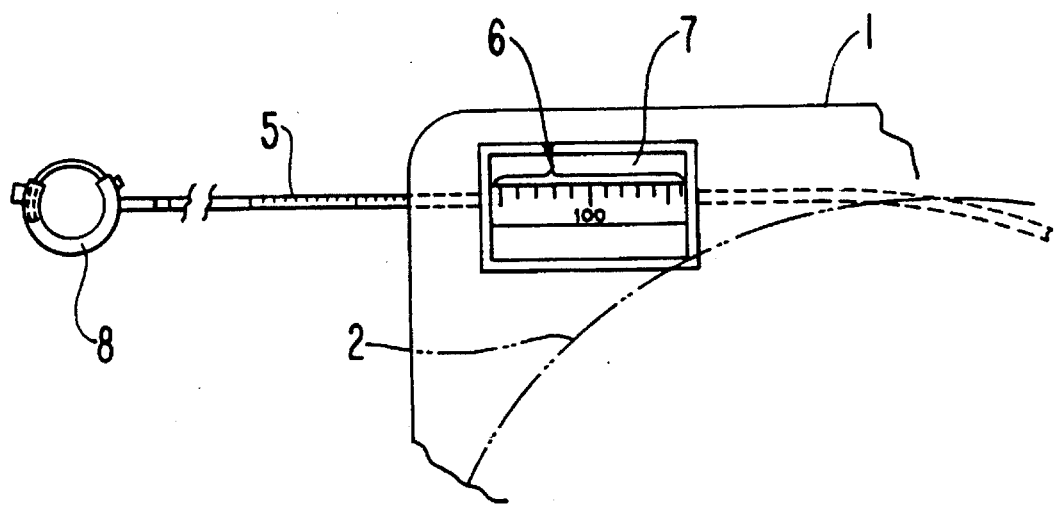
FIG. 2 is a fragmentary enlarged, plan view of the scale shown in FIG. 1.

FIG. 1 is a perspective view showing an embodiment of the scale according to the present invention, and FIG. 2 is a fragmentary enlarged view of the scale shown in FIG. 1. Referring to FIG. 1, numeral 1 denotes a casing of a somewhat flat, box-like shape, in which a drum 2 for winding a wire (hereinafter referred to as "drum") is accommodated and rotatably supported by means of a shaft 3. A handle 4 is securely mounted on one end of the shaft 3.

A metal wire of high tensile strength (hereinafter referred to as "high tensile strength wire") 5 is fixed at one end thereof to the shaft 3 of the drum 2 and wound around the shaft 3.

The high tensile strength wire 5 is provided at the surface thereof with small graduations 6 as shown in FIG. 2, and a magnifying glass 7 is provided on the casing 1 for ease of viewing the graduations 6. To the free end of the metal wire 5 is fixed an open-close ring 8. Numeral 9 in FIG. 1 denotes a fixing band for fixing the casing 1 to a belt for trousers or the like. It is preferable that the ring 8 can withstand a bending stress produced when imposed with a load of about 200 kgf. When the scale according to the present invention is used as a life line for permitting a person to escape from a window or the like of a building on fire or the like, an impact or a tensile load greater than expected is possible to work on the ring 8 and metal wire. Hence, it is preferable to use an anchoring device (not shown) for securely connecting to the high tensile strength wire 5.

The aforesaid casing 1 and drum 2 are made of a high-strength, light metal such as a high-strength aluminum alloy, for example, SUMIALTAC (registered trademark), a product of Sumitomo Electric Industries, Ltd.) or of an FRP (fiber-glass reinforced plastic) such as MCX-A (registered trademark), a product of MITSUI PETROCHEMICAL INDUSTRIES, LTD. Used as the high tensile strength wire 5 is a stranded cable wherein stranded up are 7 to 19 steel strands of ultra-fine grained metallographic structure having a grain diameter of about 20 Å (2 nm), each having a diameter of 10 to 100 μm and a tensile strength of 400 to 500 kgf/mm$^2$, or 7 to 19 carbon fibers each having a diameter of about 10 to about 20 μm and a tensile strength of which is more than 400 kgf/mm$^2$, and further 7 to 19 strands resulting therefrom are stranded up in the reverse direction (e.g. high tensile strength wire 5 has an "ordinary lay" construction as defined in Japanese Industrial Standard G 3525).

The surface of each strand or of the whole stranded cable is preferably coated with a synthetic resin, thereby performing a rust-proof effect, facilitating a provision of graduations on the surface of the stranded cable, and offering a clear view on the graduations. Favorable as the steel strand is SYFER (trademark), a product of Kobe Steel, Ltd.

Further, used as the high strength wire is a stranded rope wherein stranded up are 7 to 19 blended strands, each blended strand having a tensile strength of more than 400 kgf/mm$^2$, each blended strand being combined with the steel strands and aramid fibres such as Kevlar (registered trademark) to form a bicomponent strand. The percentage of the steel strands in the blended strands is in the range of 60% to 90%, and preferably in the range of 65% to 75%. By virtue of employing the blended strands, the flexibility of the rope can be improved.

The graduations 6 can be easily formed on the high tensile strength wire 5 by printing or marking on the coating thereof. However, the present invention is not limited to such printing or marking.

The magnifying glass is, although a common convex lens is usable therefor, preferably formed of a flat plate of a synthetic resin in view of its lightness. Alternatively, a cylindrical lens of which magnifying power is large particularly in the transverse direction of the metal wire 5 can be used therefor.

It is preferable that the aforesaid drum 2 is disposed together with a braking mechanism within the casing 1. The inner structure of an examplary scale having such a braking mechanism is shown in FIG. 3.

Figure 3:
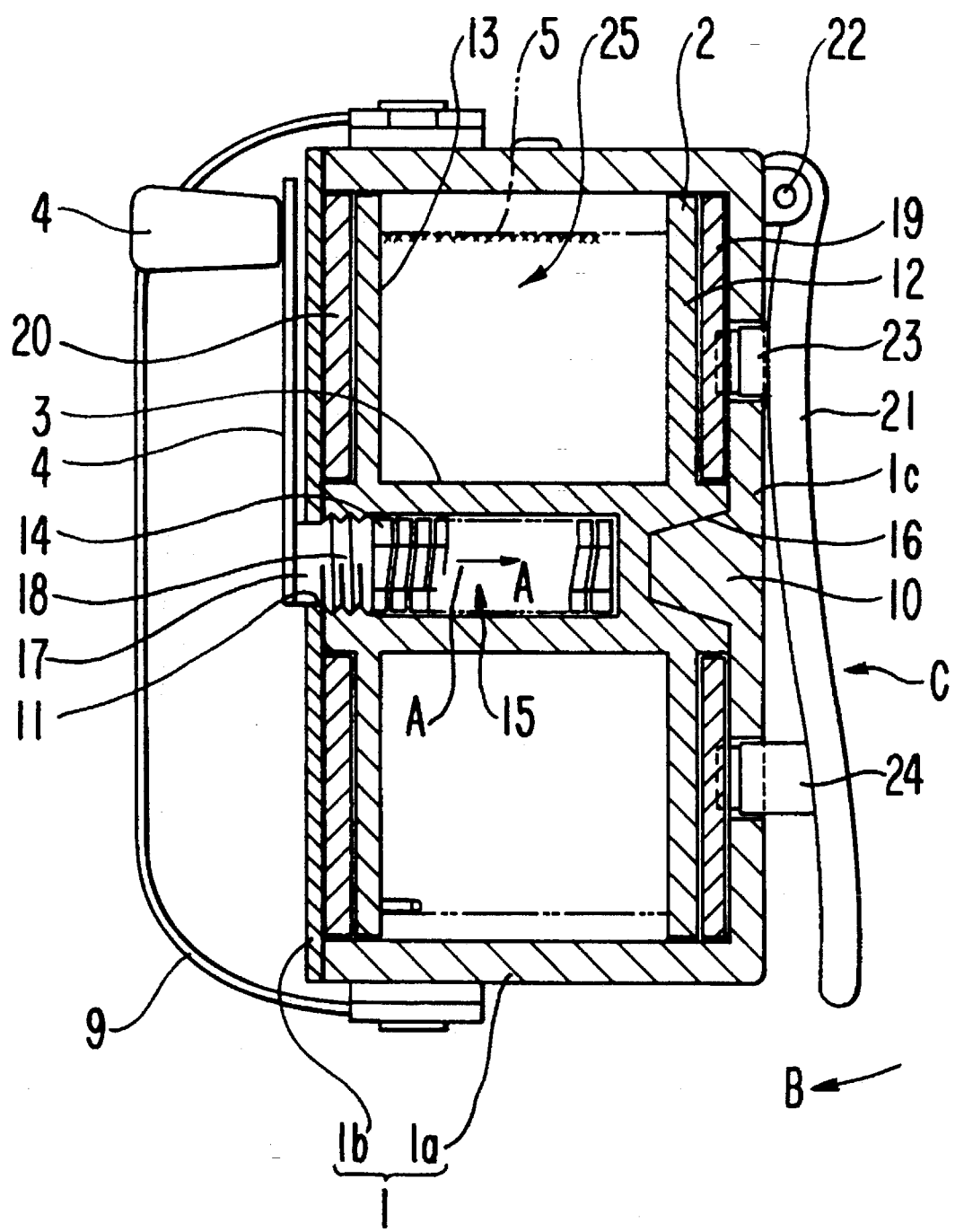
FIG. 3 is a sectional view showing an embodiment of a braking mechanism employed in the present invention.

In FIG. 3 the casing 1 comprises a box-like main body 1a and a plate-like lid member 1b. The bottom plate 1c of the main body 1a is centrally formed with a projection of truncated cone, while the lid member 1b is formed with a hole 11.

The drum 2 is of the shape wherein disk portions 12 and 13 are provided on the cylindrical shaft 3 at its outer perimeter in the proximities of both ends thereof. A hollow 14 is defined within the shaft 3 for accommodating a compression coil spring 15. Further, a recess 16 shaped into truncated cone is defined in the shaft 3 at one end thereof to be fitted with the aforesaid projection 10. On the open end of the hollow 14 is fixed a shaft 17 of the handle 4 through a screw 18. There are interposed friction disks 19 and 20 between the internal surface of the casing 1 and the disk portions 12 and 13, respectively. On an outer surface of the bottom plate 1c of the main body 1a is rotatably mounted a brake lever 21 by means of a pin 22. Projections 23 and 24 provided on the brake lever 21 at the side facing the bottom plate 1c are adapted to come into contact with the friction disk through the bottom plate 1c. It should be noted that the friction disk 19 can be engaged with or fixed to the projections 23 and 24. Further, the brake lever 21 can be joined with the shaft 3 to serve also as the handle 4.

A region, (or domain) formed around the shaft 3 of the drum 2 and located between the disk portions 12 and 13 is a space 25 for winding the high tensile strength wire 5.

In the scale thus constructed, the projection 10 and the recess 16 are closely fitted with each other when in a usual condition by the urging force of the compression coil spring 14 which exerts in the direction indicated by an arrow A, thereby effecting a locking action (or a strong braking action). Accordingly the high tensile strength wire will be drawn out little more.

When the brake lever 21 is pressed in the direction indicated by an arrow B, the projections 23 and 24 press, through the friction disk 19, the drum 2 in the direction indicated by an arrow C, whereby the locking action between the projection 10 and the recess 16 is cancelled, with the result that a gentle braking action by the friction disks 19 and 20 is effected.

Figure 4:
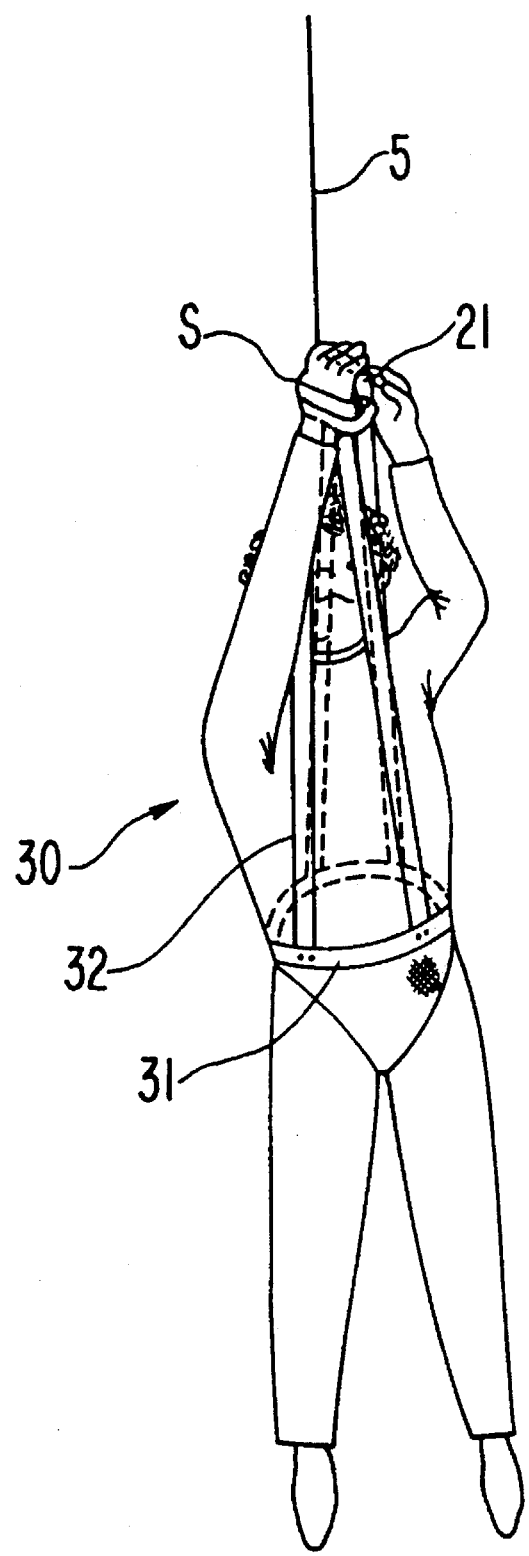
FIG. 4 is an explanatory view illustrating an example of a person using a scale according to the present invention.

Accordingly, when a user 30 suspended with the high tensile strength wire 5 as shown, for example, in FIG. 4 presses the brake lever 21, the user descends slowly while the high tensile strength wire 5 is unwound from the drum by the weight of the user with a gentle braking action exerted. When the user descends as low as a desired height, for example, to the lower floor next to the floor on fire, the user releases the brake lever to stop and lock the rotation of the drum 2, thereby enabling himself to move to the lower floor safely. It should be noted that although the scale S is connected to the user by means of a belt 31 around the waist and four suspender belts 32, it can be connected to the user by means of a belt for trousers or the like. The belt 31 to be tied around the waist and suspender belts 32 might be carried together with the scale S by the user or installed conspicuously in each room of a building such as a hotel.

Figure 5:
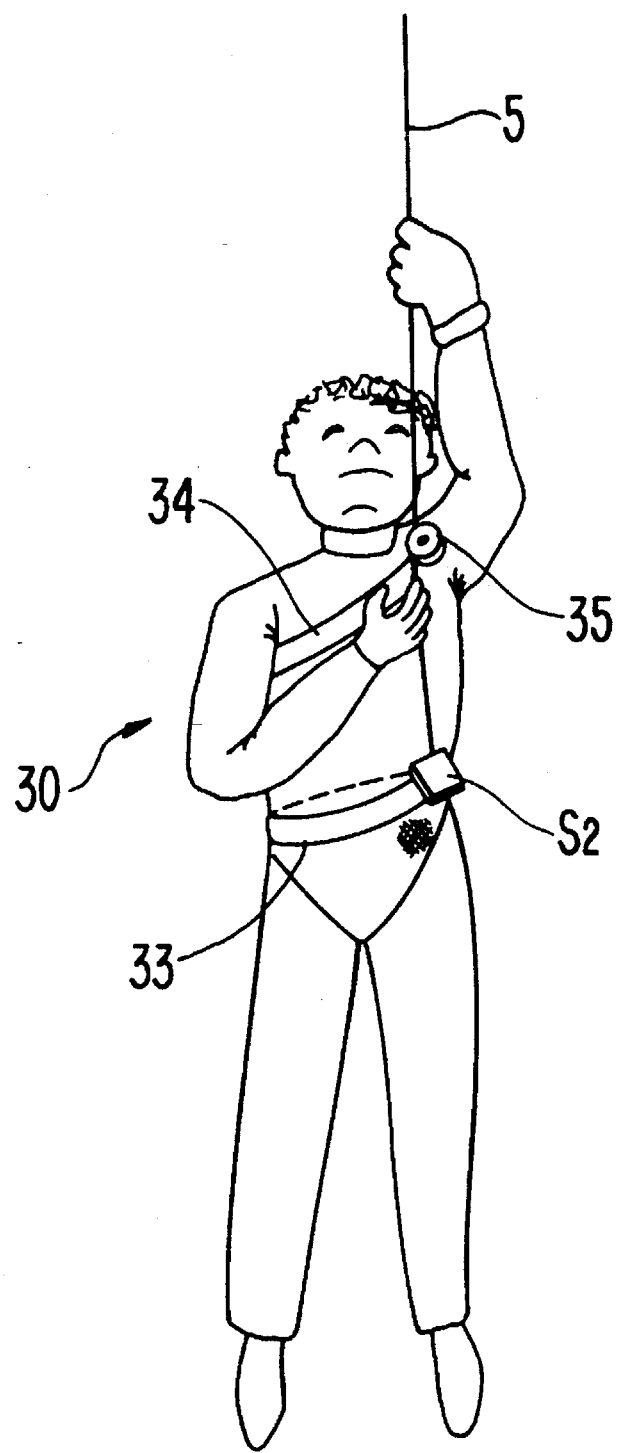
FIG. 5 is also an explanatory view illustrating an alternative example of a state of use of a scale according to the present invention.

The aforesaid braking mechanism and locking mechanism need not necessarily be formed separately, and can be formed of one friction disk which is capable of adjusting the braking force. The braking mechanism or the like need not necessarily be built in the casing 1. For instance, mechanisms for locking and braking a pulley 35 might be incorporated in the pulley 35, which is supported on a belt 34 tied around the shoulder and side of the user, while a scale S2 is connected to another belt 33 around the waist of the user, as shown in FIG. 5. In this case, the high tensile strength wire 5 is wound on the pulley 35 a few times so as not to slip thereon.

In the case of the example shown in FIG. 5, the user is supported at the scale S2 fixed to the belt 33 for trousers and at the pulley 35 positioned adjacent user's shoulder and, hence, there is an advantage that the posture of the user can be stabilized. If the user needs to escape from a high-rise building, two or more scales can be connected to elongate the length of the high tensile strength wire so as to permit the user to escape safely therefrom.

Figure 6:
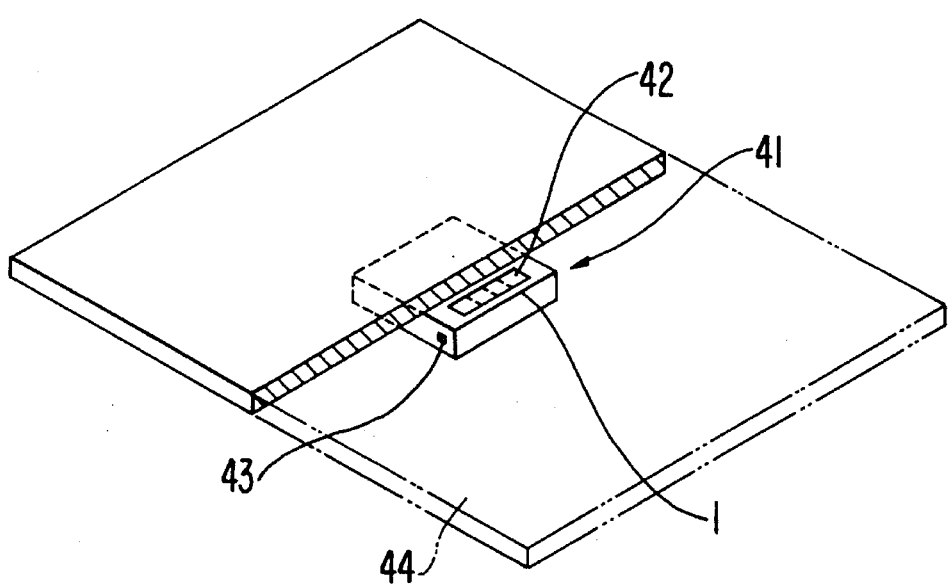
FIG. 6 is a perspective view showing an alternative embodiment of a scale according to the present invention.

FIG. 6 shows an embodiment of the scale wherein a scale 41 usable as a life line further incorporates a weight-measuring scale. In this scale, a handle or a like component is made collapsible (or removable) so as not to project from the upper or lower face of the casing I, and these faces are made flat and parallel to each other.

Within the casing 1 are provided a pressure sensor 41, such as a load cell, for sensing a pressure applied to a region between the upper and lower faces of the casing 1 and a memory element (such as a register) for temporarily storing output data of the pressure sensor. Further, on the surface of the casing 1 are provided an indicator 42 (preferably a digital indicator) for indicating the data stored in the register and a reset switch 43 for clearing the memory element.

Figure 7:
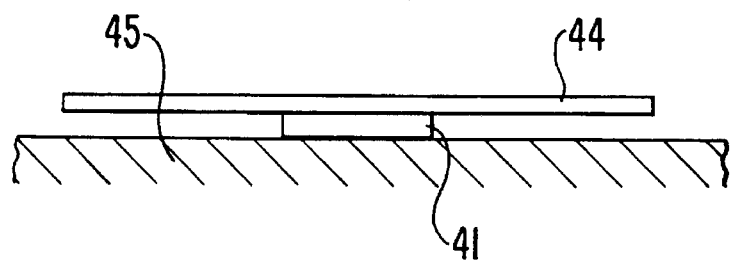
FIG. 7 is a sectional view of the scale shown in FIG. 6.

The scale 41 of this embodiment can be used as a weight-measuring scale by placing it on a floor and putting a plate 44 on it, as shown in FIG. 7. Since the upper and lower faces of the casing 1 are flat and parallel to each other, the plate 44 is stabilized and thus, can convey the weight of user to the pressure sensor accurately. Although the indicator 42 is not viewed due to the plate 44 upon weighing, the memory element stores the load weighed and, hence, one can know the weight by viewing the indicator 42 after removing the plate 44, followed by depressing the reset switch 43. Thus, this scale can measure both height and weight, the height of anyone being able to be measured with the high tensile strength wire 5.

Before used as a life line, the scale is used to measure the weight of user together with the weight of his or her belongings to make sure whether or not the metal wire 5 will sustain the total weight safely. Also, in case that two or more persons, for example children, are to be saved at a time with this sale, the weights of the persons are measured and summed up in advance to make sure the safety of the metal wire.

Although it is preferable to use as the weight-measuring scale a device for directly converting a force into electricity such as a pressure sensor, the weight-measuring scale may be of the constitution adapted to measure person's weight on the basis of the amount of deformation of a spring such as a compression coil spring 14 as shown in FIG. 3.

If the weight-measuring scale is provided between the fixing band 9 and the casing 1 shown in FIG. 1, person's weight can be measured in such a manner that the fixing band 9 is hooked at a high location and anyone hangs by the casing 1.

Figure 8:
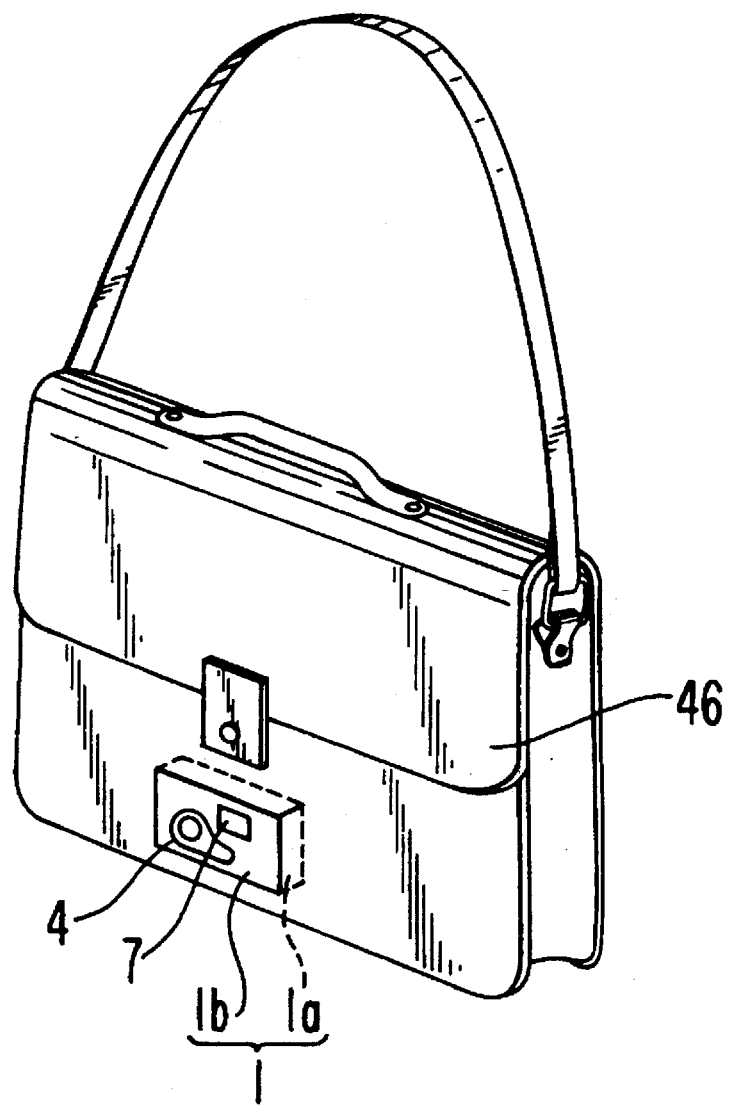
FIG. 8 is a perspective view showing an example of a bag incorporated with a scale according to the present invention.

The scale of the present invention may be either formed independently or incorporated into a shoulder bag 46, bag, pochette or the like so as to enhance its carrying property. In the case of such incorporation, the casing 1 is formed of a portion of a bag or the like. Note that in FIG. 8 numeral 4 denotes a brake lever and numeral 7 a magnifying glass.

The scale of the present invention can usually be used like a tape measure for measuring a long distance while, at the same time, being usable as a life line in case of emergency. Further, a metal wire of a high tensile strength is used as a scale, resulting in a light and compact form of scale. For this reason the scale of the present invention is convenient for carrying, particularly during a trip abroad. While a conventional life line when packed in baggage could not be used in time in case of emergency, the scale of the present invention can, in contrast, always be carried by the user or accommodated in a handbag to make ready for use.

Though several embodiments of the invention described above, it is to be understood that the present invention is not limited to the above-mentioned embodiments, and various changes and modifications may be made in the invention without departing from the spirit and scope thereof.

What is claimed is:

1. A lifesaving apparatus comprising a scale usable as a life line, said scale comprising a high tensile strength wire with graduations in a longitudinal direction thereof, a drum for winding the high tensile strength wire thereonto, a casing accommodating the drum while permitting the same to rotate, a magnifying glass on said casing for allowing the graduations to be read, and means for carrying a person, wherein the high tensile strength wire is formed of a stranded rope formed of a plurality of 7 to 19 blended strands, each blended strand being a combination of steel strands made of steel wire of a fine grained composition each having a diameter of 10 to 100 µm, and aramid fibre, each blended strand having a tensile strength of at least 400 kfg/mm$^2$ such that said high tensile strength wire is capable of suspending a person, said strands having a coat of a synthetic resin covering the strands and said means for carrying a person is connected to an end of said scale.

2. The lifesaving apparatus of claim 1, wherein the percentage of the steel strands in the blended strands is in the range of 65% to 75%.

3. The lifesaving apparatus of claim 1, wherein the percentage of the steel strands in the blended strands is in the range of 60% to 90%.

* * * * *